(12) United States Patent
Joynes et al.

(10) Patent No.: US 8,944,912 B2
(45) Date of Patent: *Feb. 3, 2015

(54) COMBINATION GAME CONTROLLER AND INFORMATION INPUT DEVICE FOR A TABLET COMPUTER

(71) Applicant: Wikipad, Inc., Los Angeles, CA (US)

(72) Inventors: Matthew R. Joynes, Agoura Hills, CA (US); James Bower, Windermere, FL (US); Daniel P. Dooley, Oklahoma City, OK (US)

(73) Assignee: Wikipad, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,153

(22) Filed: Nov. 19, 2012

(65) Prior Publication Data
US 2013/0154943 A1    Jun. 20, 2013

Related U.S. Application Data

(63) Continuation-in-part of application No. 13/494,801, filed on Jun. 12, 2012.

(60) Provisional application No. 61/577,709, filed on Dec. 20, 2011.

(51) Int. Cl.
*G06F 1/16* (2006.01)
*G06F 13/00* (2006.01)
(Continued)

(52) U.S. Cl.
CPC .............. *G06F 3/0219* (2013.01); *A63F 13/08* (2013.01); *G06F 1/1632* (2013.01); *A63F 13/06* (2013.01); *A63F 2300/1043* (2013.01); *A63F 2300/204* (2013.01)

USPC ........... 463/36; 361/679.11; 463/37; 710/303

(58) Field of Classification Search
USPC ............... 361/679.11; 455/422.1; 463/36–38; 710/303
See application file for complete search history.

(56) References Cited

U.S. PATENT DOCUMENTS 5,967,898 A    10/1999    Takasaka et al.
5,976,018 A    11/1999    Druckman
(Continued)

OTHER PUBLICATIONS

Chartier; "Preorders begin for iPhone, iPod touch game controller." Published Feb. 8, 2011; In Macworld website (online); http://www.macworld.com/article/1157741/icontrolpad.html; entire document especially p. 1.

(Continued)

*Primary Examiner* — Dmitry Suhol
*Assistant Examiner* — Jason Yen
(74) *Attorney, Agent, or Firm* — Hall Estill Attorneys at Law; Daniel P. Dooley (57) ABSTRACT

An apparatus generally directed to a combination game controller and information input device. The combination preferably includes a tablet computer providing a plurality of sides, in which each of the sides are disposed between an electronic display screen and a back of the tablet computer. The combination further preferably includes an input device in electronic communication with the tablet computer, the input device providing side structures adjacent to and confining the tablet computer on at least two opposing sides of the tablet computer. The input device further preferably providing input module apertures, each input module aperture selectively accepts either a game control module or a removable keyboard module. The input module apertures are preferably adjacent each of the at least two opposing sides of the tablet computer, and a camera communicating with each the input device and the tablet computer, the camera selectively capturing either still or video images.

20 Claims, 10 Drawing Sheets

(51) Int. Cl.
*G06F 17/00* (2006.01)
*G06F 3/02* (2006.01)
*A63F 13/90* (2014.01)
*A63F 13/20* (2014.01)

(56) References Cited

U.S. PATENT DOCUMENTS

| | | |
|---|---|---|
| 6,290,565 B1 | 9/2001 | Galyean, III et al. |
| 6,710,764 B1 | 3/2004 | Burgel et al. |
| 7,200,702 B2 | 4/2007 | Keely et al. |
| 7,298,613 B2 | 11/2007 | Yin et al. |
| 7,653,771 B2 * | 1/2010 | Liberty .................. 710/303 |
| 7,733,637 B1 * | 6/2010 | Lam .................. 361/679.11 |
| 7,746,629 B2 | 6/2010 | Assouad et al. |
| 7,758,424 B2 | 7/2010 | Riggs et al. |
| 7,774,155 B2 | 8/2010 | Sato et al. |
| 7,818,668 B2 | 10/2010 | Michelstein et al. |
| 7,933,118 B2 | 4/2011 | Chiu et al. |
| 7,942,745 B2 | 5/2011 | Ikeda et al. |
| 8,018,098 B2 | 9/2011 | Lu et al. |
| 8,100,769 B2 | 1/2012 | Rabin |
| 8,100,770 B2 | 1/2012 | Yamazaki et al. |
| 8,180,295 B2 | 5/2012 | Mao |
| 8,188,977 B2 | 5/2012 | Kuwaki et al. |
| 8,192,285 B2 | 6/2012 | Cheng et al. |
| 2002/0155890 A1 * | 10/2002 | Ha et al. .................. 463/36 |
| 2003/0147008 A1 | 8/2003 | Liu |
| 2003/0231189 A1 | 12/2003 | Williams |
| 2004/0222970 A1 * | 11/2004 | Martinez et al. ............ 345/169 |
| 2005/0255915 A1 * | 11/2005 | Riggs et al. .................. 463/37 |
| 2005/0272471 A1 | 12/2005 | Sherman |
| 2006/0291156 A1 | 12/2006 | Allen |
| 2007/0268247 A1 | 11/2007 | Quatro |
| 2009/0209288 A1 | 8/2009 | Rofougaran |
| 2009/0280863 A1 * | 11/2009 | Shin et al. .................. 455/557 |
| 2009/0291760 A1 | 11/2009 | Hepburn et al. |
| 2010/0069160 A1 * | 3/2010 | Barrett et al. .................. 463/46 |
| 2010/0081505 A1 * | 4/2010 | Alten et al. .................. 463/36 |
| 2010/0250815 A1 * | 9/2010 | Street et al. .................. 710/303 |
| 2011/0076003 A1 * | 3/2011 | Cho et al. .................. 396/297 |
| 2011/0118022 A1 | 5/2011 | Aronzon et al. |
| 2011/0143835 A1 * | 6/2011 | Sizelove .................. 463/31 |
| 2011/0230178 A1 * | 9/2011 | Jones et al. .................. 455/422.1 |
| 2011/0260969 A1 | 10/2011 | Workman |
| 2012/0108335 A1 | 5/2012 | Liotta et al. |
| 2012/0169597 A1 | 7/2012 | Liotta |
| 2012/0236485 A1 * | 9/2012 | Staats et al. ............ 361/679.12 |
| 2012/0315989 A1 * | 12/2012 | Young et al. .................. 463/37 |

OTHER PUBLICATIONS

Wattanajantra; "iControlPad unofficial iPhone gamepad coming soon." In c/net UK website (online); Published Aug. 27, 2010; http://crave.cnet.co.uk/mobiles/icontrolpad-unofficial-iphone-gamepad-coming-soon-50000514; entire document, especially pp. 3, 4.

Atari Arcade; Website Printout; http://atari.com/buy-games/arcade/atari-arcade-ipad; Nov. 30, 2011; pp. 1-3.

Ion iCade Arcade Cabinet; Website Printout; http://www.ionaudio.com/products/details/icade; 2012; pp. 1-6.

* cited by examiner

COMBINATION GAME CONTROLLER AND INFORMATION INPUT DEVICE FOR A TABLET COMPUTER

RELATED APPLICATIONS

This application is a continuation-in-part of U.S. patent application Ser. No. 13/494,801 filed on Jun. 12, 2012, which in turn claims priority to U.S. Provisional Patent application Ser. No. 61/577,709 filed on Dec. 20, 2011.

SUMMARY OF THE INVENTION

In a preferred embodiment, a combination preferably includes a tablet computer providing a plurality of sides, in which each of the sides are disposed between an electronic display screen and a back of the tablet computer. The combination further preferably includes an input device in electronic communication with the tablet computer, the input device providing side structures adjacent to and confining the tablet computer on at least two opposing sides of the tablet computer. The input device further preferably providing input module apertures, each input module aperture selectively accepts either a game control module or a removable keyboard module. The input module apertures are preferably adjacent each of the at least two opposing sides of the tablet computer, and a camera communicating with each the input device and the tablet computer, the camera selectively capturing either still or video images.

DETAILED DESCRIPTION

The present disclosure generally relates to a combination game controller and information input device directed to controlling electronic games and entry of information to a tablet computer, also referred to herein as video games, computer and applications games. The apparatus preferably includes a tablet computer, an electronic game communicating with the tablet computer, and an input device for controlling movement of a virtual object provided by the electronic game, and entry of information into the tablet computer. In a preferred embodiment, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

Figure 1:
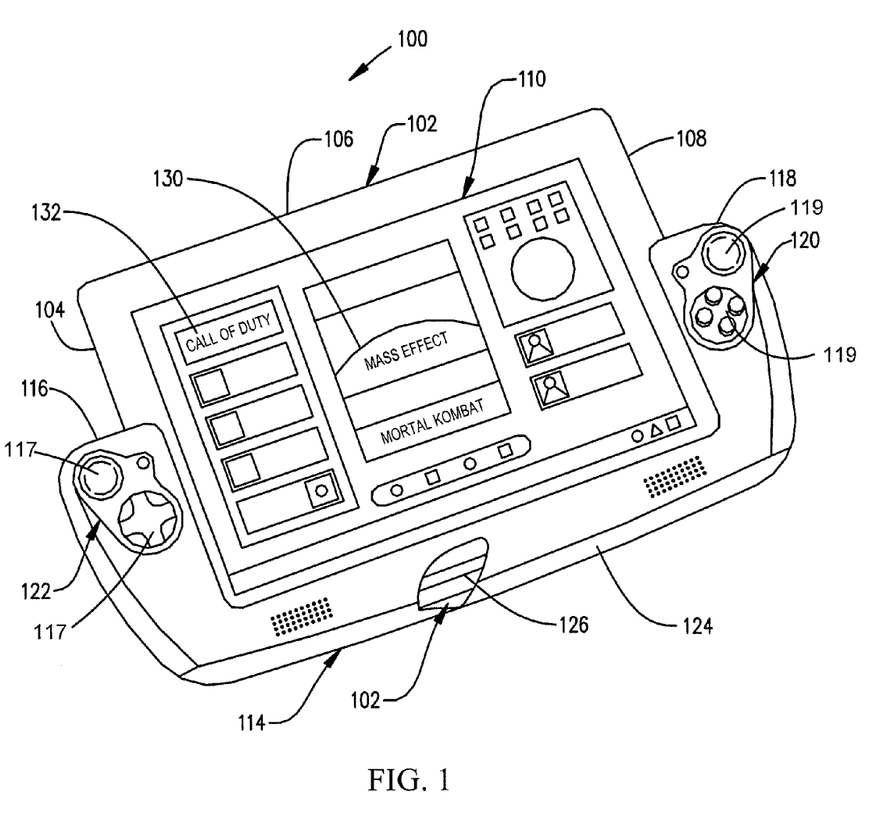
FIG. 1 is a front perspective view, with partial cutaway, of an embodiment an electronic game control apparatus constructed and operated in accordance with various embodiments disclosed and claimed herein.

Turning to the drawings, FIG. 1 provides an exemplary game controller and information entry device ("G & D") 100 capable of being used in accordance with various embodiments of the present invention. The exemplary G & D 100 has at least a tablet computer 102 (also referred to herein as a computing device), which provides a plurality of sides, such as 104, 106, 108, and 126. Each of the plurality of sides 104, 106, and 108 are disposed between an electronic display screen 110, of the tablet computer 102, and a back 112 (shown by FIG. 2) of the tablet computer 102 operates. The G & D 100 further preferably includes an input device 114.

In a preferred embodiment, the input device 114 provides a pair of side structures, 116 and 118 with a bridge structure 115 disposed therebetween. The bridge structure 115, conceals not more than one third of the back 112, of the tablet computer 102. One of the pair of side structures, for example 116, is adjacent to and confines the tablet computer 102 on a first side, such as 104 of the plurality of sides 104, 106, 108, and 126 of the tablet computer 102. The second side structure of the pair of side structures, such as 118, is adjacent to and confines the tablet computer 102 on a second side, such as 108, of the plurality of sides 104, 106, 108, and 126 of the tablet computer 102, wherein the first and second sides, such as 104 and 108, of the plurality of sides 104, 106, 108, and 126 of the tablet computer 102 are opposing sides of the plurality of sides 104, 106, 108, and 126, of the tablet computer 102.

In a preferred embodiment, the input device 114 further provides a plurality of removable game control modules 120 and 122, wherein the removable game control modules 120 and 122 are adjacent each of the at least two opposing sides 104 and 108, of the plurality of sides 104, 106, 108, and 126, of the tablet computer 102, and a bridge structure 124, disposed between the pair of side structures 116 and 118, and adjacent the third side 126, of the plurality of sides 104, 106, 108, and 126, of the tablet computer 102.

Figure 8:
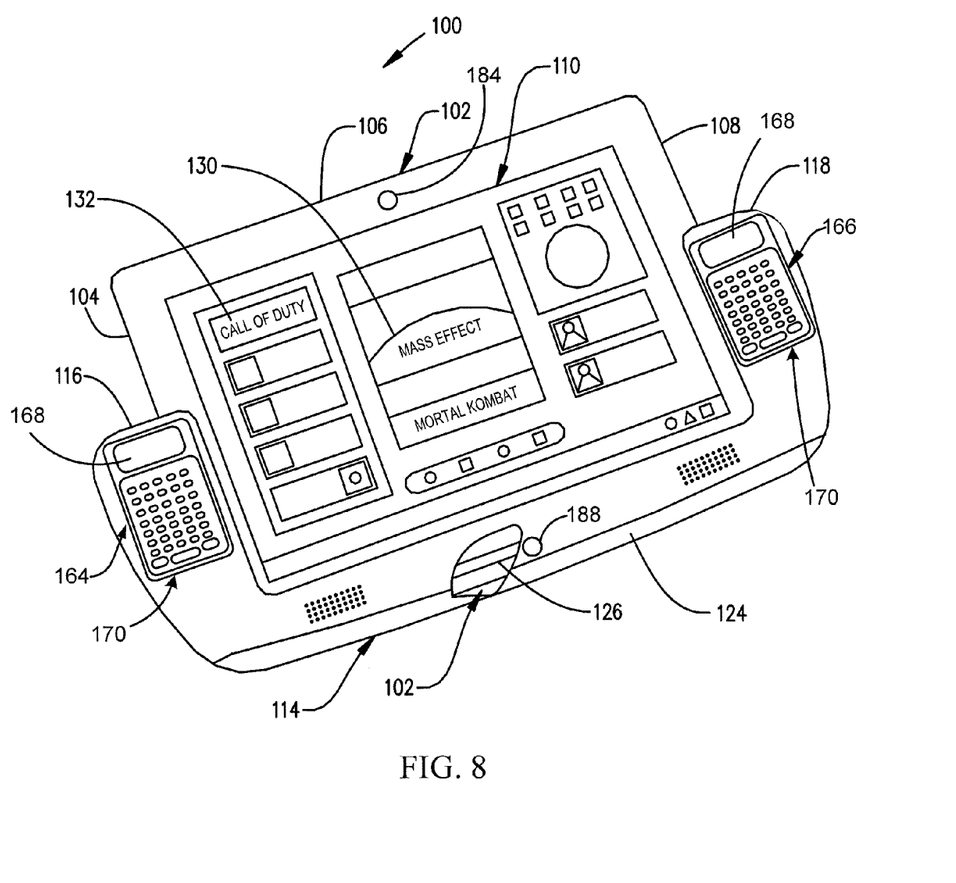
FIG. 8 displays a front perspective view, with partial cutaway, of a combination electronic game control and information input device constructed and operated in accordance with various embodiments disclosed and claimed herein.

In a preferred embodiment, the removable game control modules 120 and 122 may be removed from the input device 114, and replaced by removable keyboard modules 164 and 166, of FIG. 8. To facilitate the exchange of modules, the input device preferably provides a pair of input module apertures 170. The removable keyboard modules collectively form a full function keyboard and each provide an auxiliary electronic display screen ("ADS") 168, each ADS 168 having at least the functionality of the electronic display screen 110.

Figure 10:
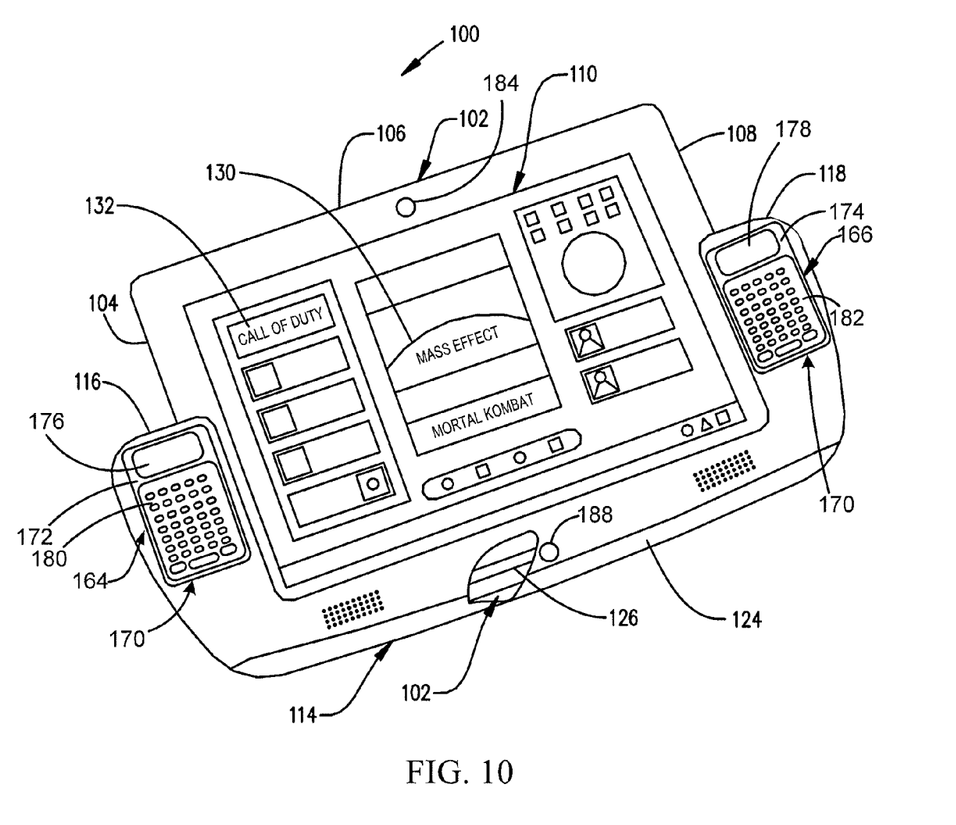
FIG. 10 illustrates a front perspective view, with partial cutaway, of an alternate embodiment of a combination electronic game control and information input device constructed and operated in accordance with various embodiments disclosed and claimed herein.

In an alternate embodiment, shown by FIG. 10, the removable keyboard modules 164 and 166 are a pair of touch responsive electronic display screens 172 and 174, each of the touch responsive electronic display screens having at least the functionality of the electronic display screen 110, include the functionality of a mouse pad portions 176 and 178, and selectively presents keys of a keyboard 180 and 182 for information entry. Preferably, the keys are virtual keys that respond to a touch by a user.

Returning to FIG. 1, preferably, the bridge structure 124 in combination with the pair of side structures 116 and 118 form a three sided structure 128 (of FIG. 5) (also referred to herein as a u-shaped structure 128 of the input device 114), in which the tablet computer 102 nests, such that the tablet computer 102 is confined by the u-shaped structure 128, and the u-shaped structure 128 mitigates inadvertent removal of the tablet computer 102 from the u-shaped structure 128 when the tablet computer 102 is fully nested within the three sided structure 128.

The G & D 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of a character. It is noted that FIG. 1 displays the housings of the plurality of switches, whereas at least some of the plurality of switches are shown in the partial cutaway of FIG. 3.

Figure 2:
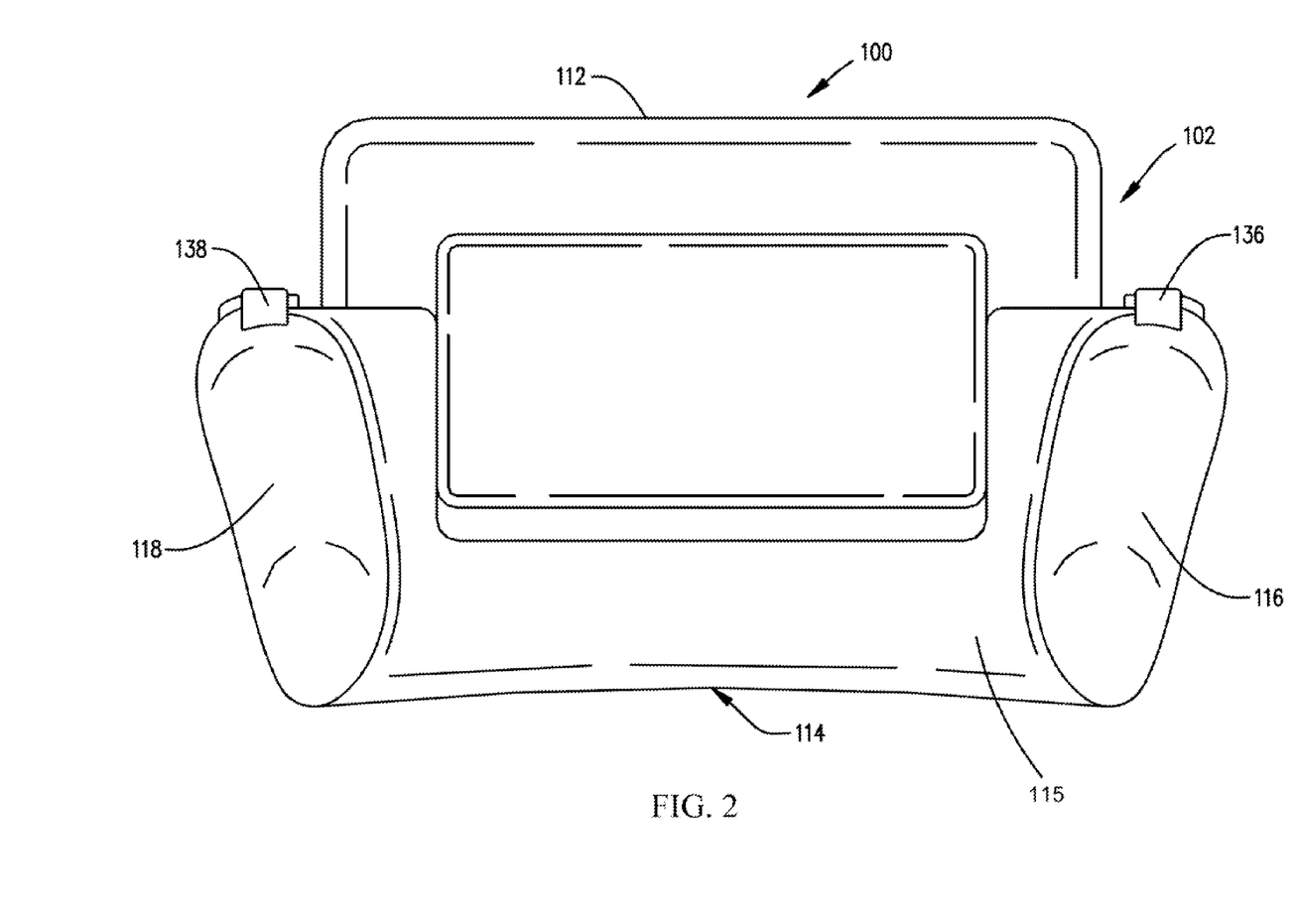
FIG. 2 shows a back plan view of the apparatus of FIG. 1.

FIG. 2 depicts and reveals the back 112 of the tablet computer 102. Further shown by FIG. 2, is the input device 114, which provides a pair of trigger switches 136 and 138, supported by their corresponding side structures 116 and 118 respectively.

Figure 3:
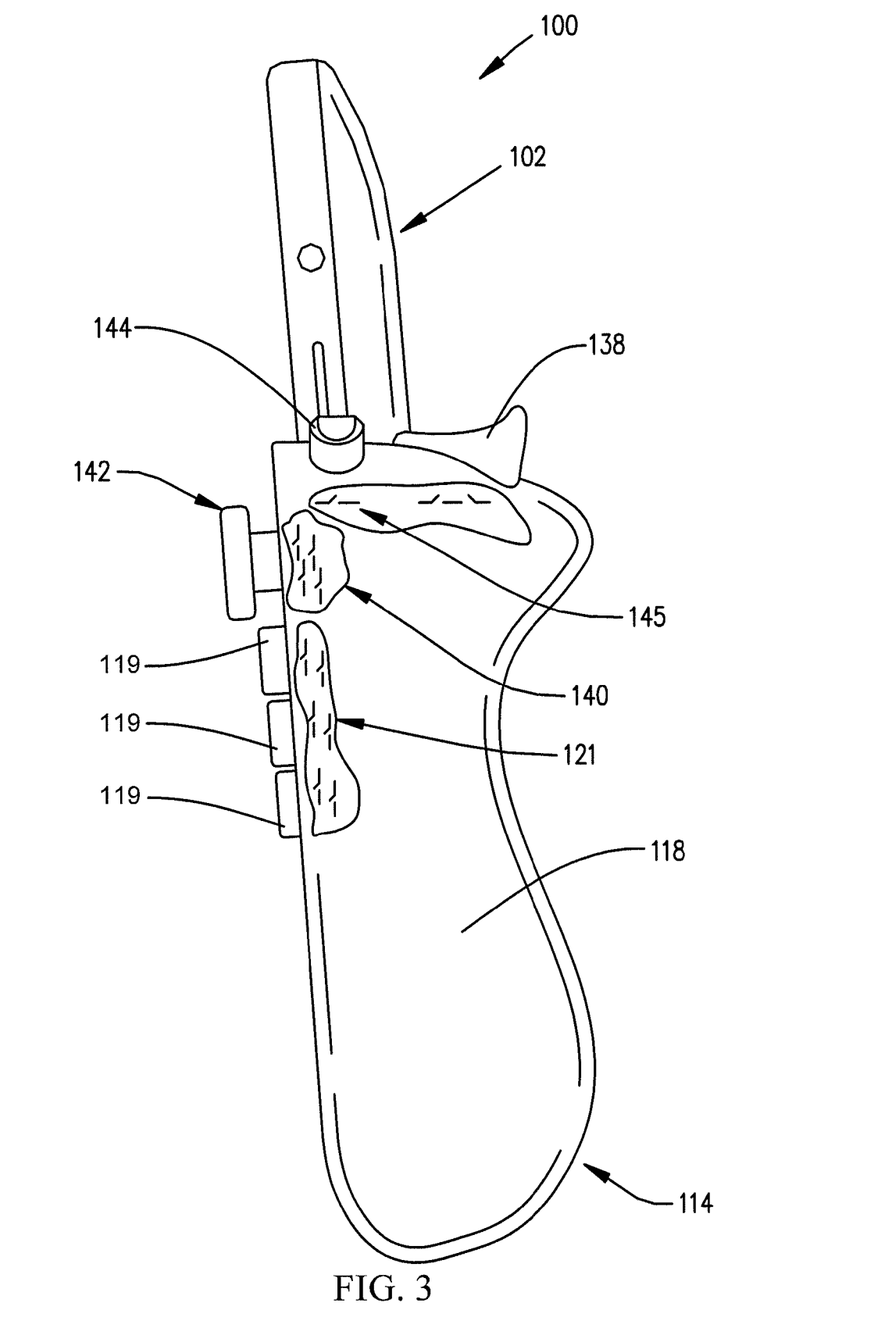
FIG. 3 displays a right side plan view, with partial cutaway, of the apparatus of FIG. 1, constructed in accordance with various embodiments disclosed and claimed herein.

FIG. 3 shows that a predetermined number of the plurality of switches 140, collaborate with each other to form an input apparatus 142, the input apparatus 142 controls display of virtual objects displayed on the electronic display screen 110 of the tablet computer 102. Preferably, the input apparatus 142 is a joystick 142. FIG. 3 further shows that the input device 114 provides a plurality of buttons 144 and 119 of the removable game control modules 120, which activate corresponding switches 145 and 121. The main function of the trigger 138, the joystick 142, and the buttons 144 and 119 of the removable game control modules 120 is to govern the movement/actions of a playable body/object or otherwise influence events in a video game 130 (of FIG. 1) or an alternate computer game.

Figure 4:
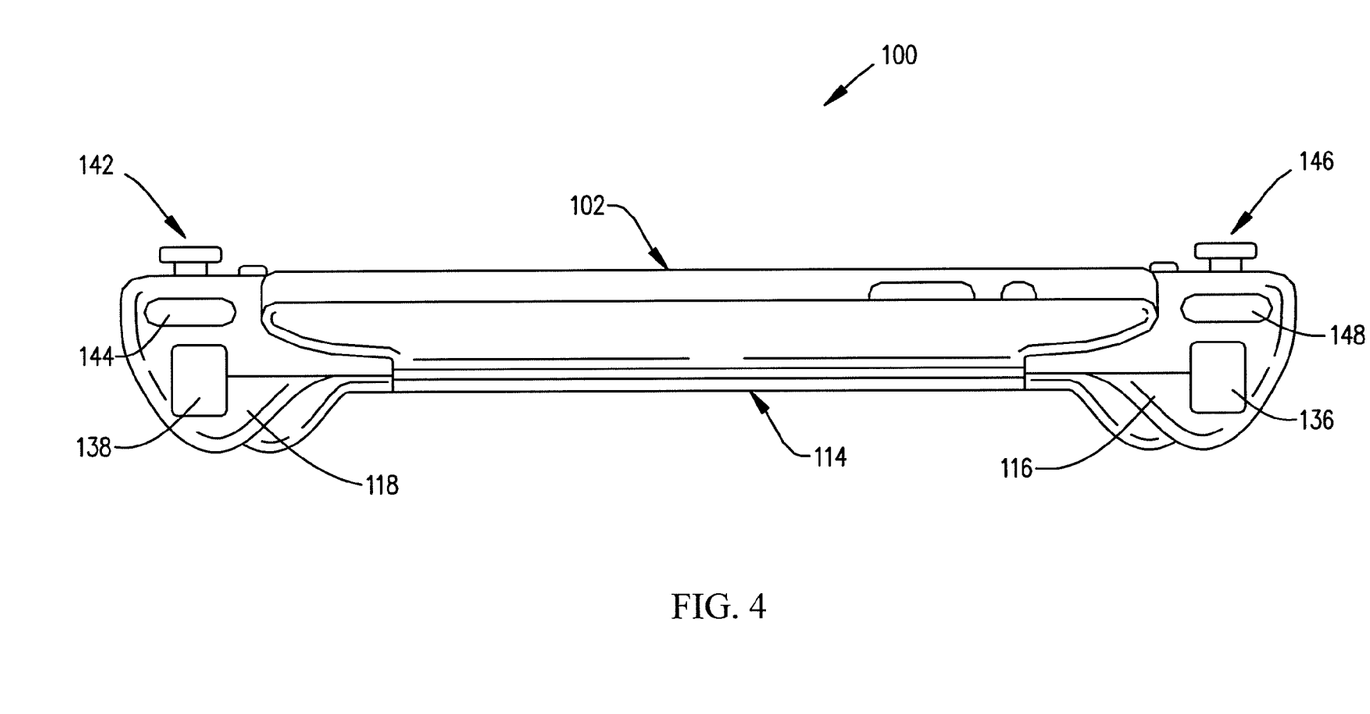
FIG. 4 depicts a right side plan view of the apparatus of FIG. 1, constructed in accordance with various embodiments disclosed and claimed herein.
Figure 5:
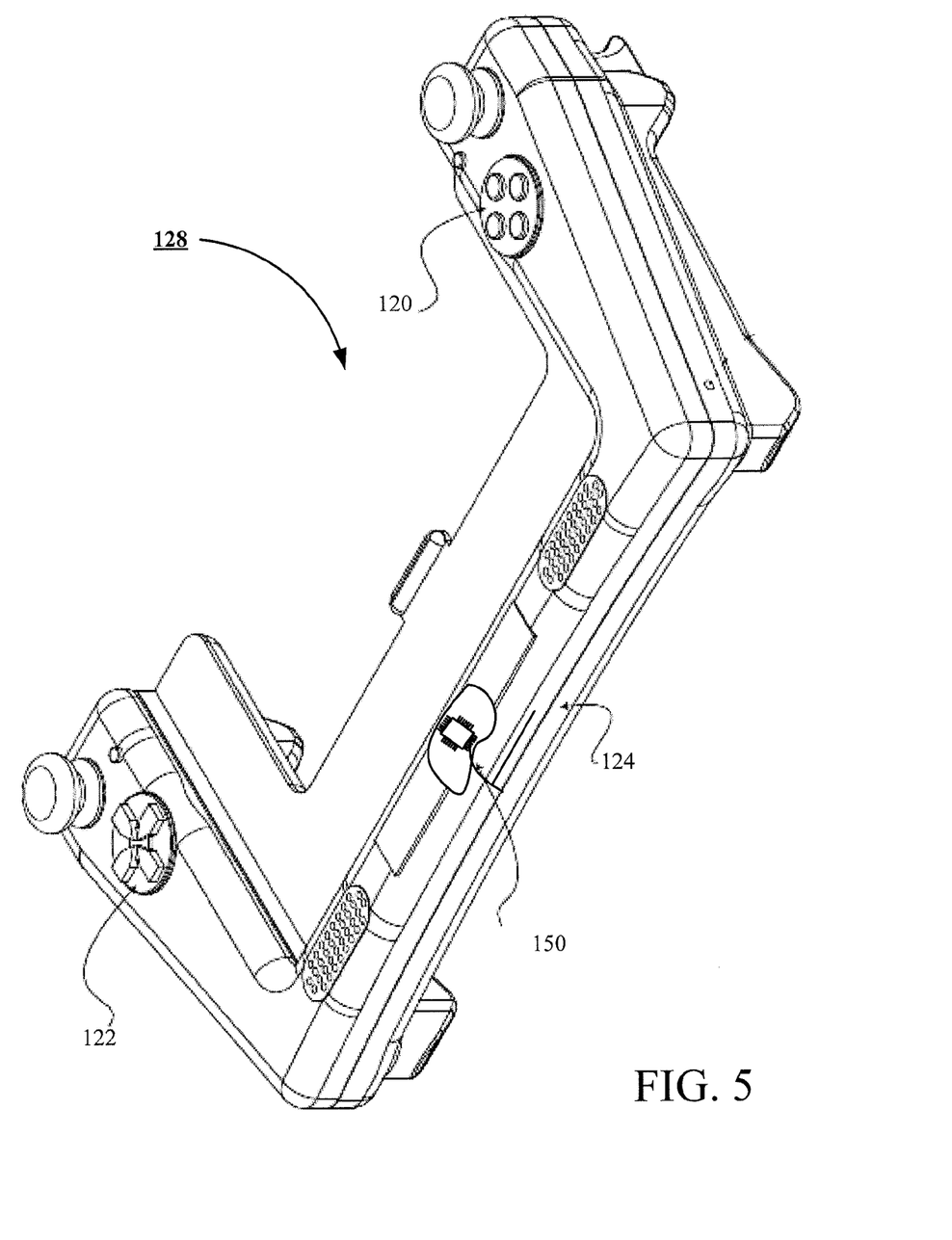
FIG. 5 illustrates a top perspective view of an embodiment of an input device of FIG. 1, constructed in accordance with various embodiments disclosed and claimed herein.

FIG. 4 shows the G & D 100, further includes a second joystick 146, and a second button 148, which are provided on the side structure 116, adjacent trigger 136. While FIG. 5 shows the central processing unit (CPU) 150, of the input device 114.

Figure 6:
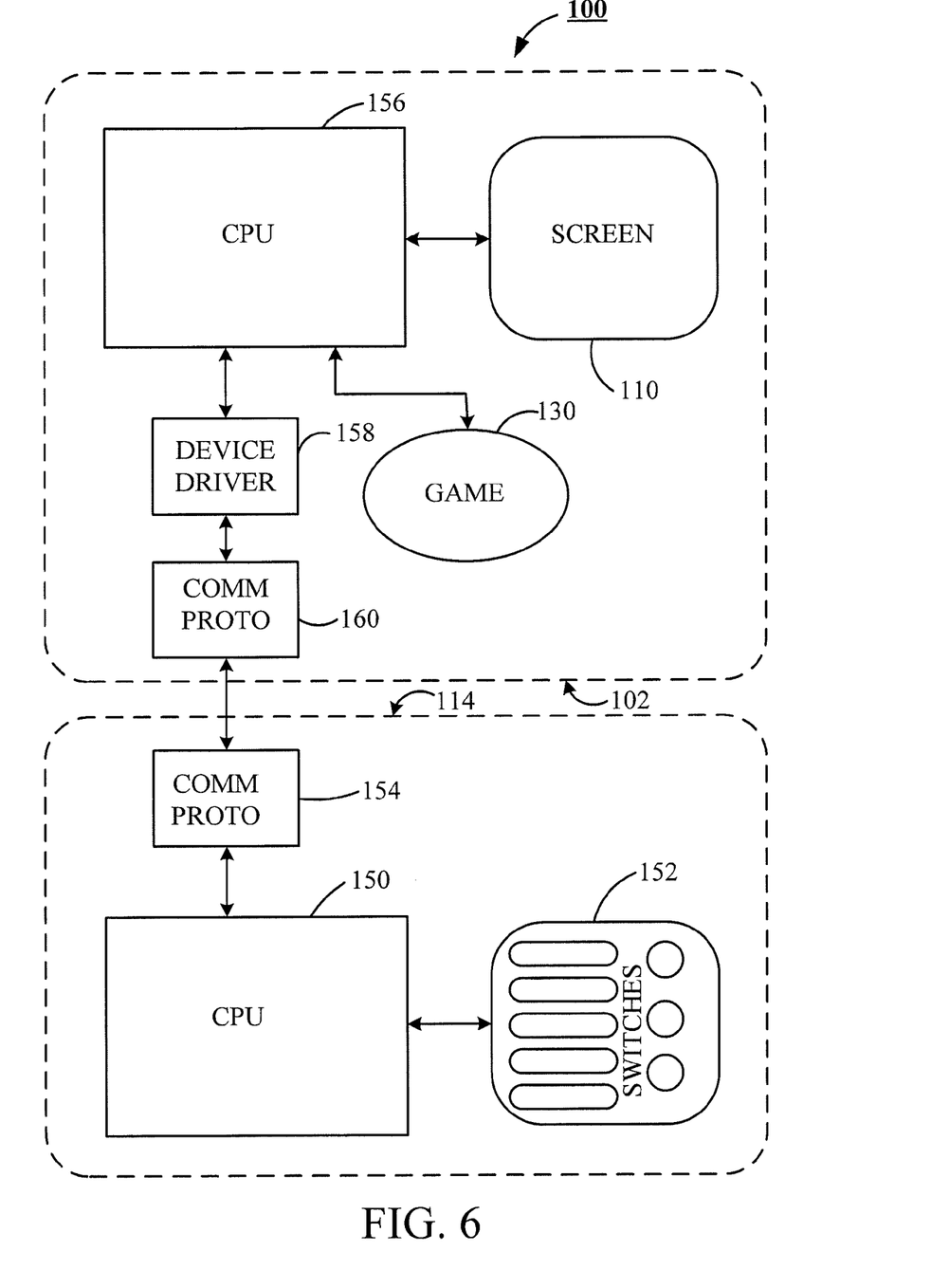
FIG. 6 is a block diagram of an embodiment of the apparatus of FIG. 1.

FIG. 6 shows the input device 114 includes the CPU 150, interacting with the plurality of switches 152, which preferably include at least switches 119 of the removable game control modules 120 (of FIG. 1), switches 117 of the removable game control modules 122 (of FIG. 1), 136, 138, 142, 144, 146, and 148 (of FIGS. 2 and 3). FIG. 6 further shows the input device 114 includes a communications protocol 154 providing the communication link between the tablet computer 102, and the input device 114. In a preferred embodiment a Universal Serial Bus (USB) communications protocol is utilized. However, as those skilled in the art will recognize, the communications protocol 154 is not limited to a USB protocol.

FIG. 6 further shows that the tablet computer 102 preferably includes at least a CPU 156, interacting with the electronic display screen 110, the video game 130, a device driver 158, which facilitates the interaction between the tablet computer 102 and the input device 114, and a communications protocol 160 providing the communication link between the tablet computer 102, and the input device 114. In a preferred embodiment a Universal Serial Bus (USB) communications protocol is utilized. However, as those skilled in the art will recognize, the communications protocol 160 is not limited to a USB protocol.

Figure 7:
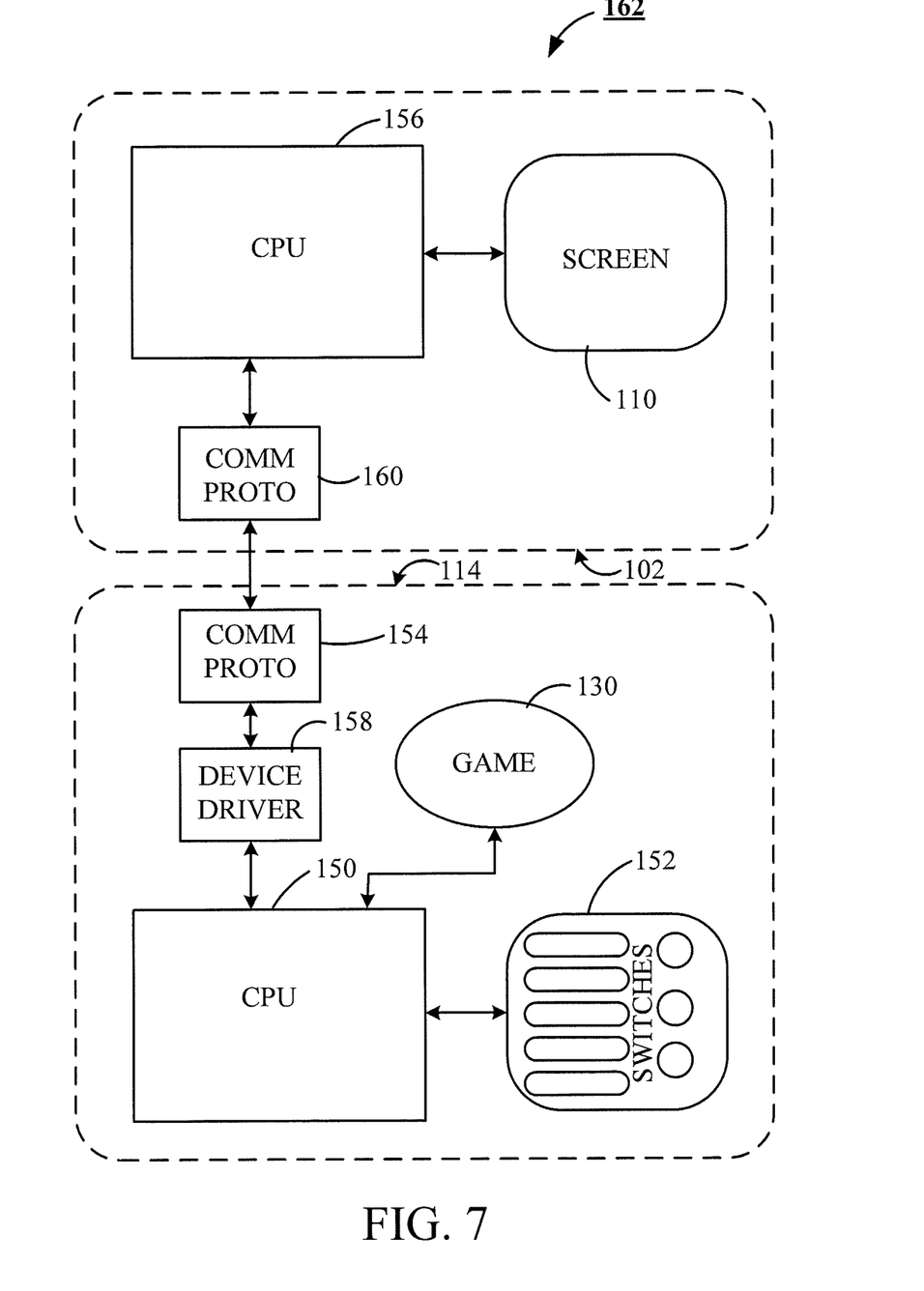
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

Figure 9:
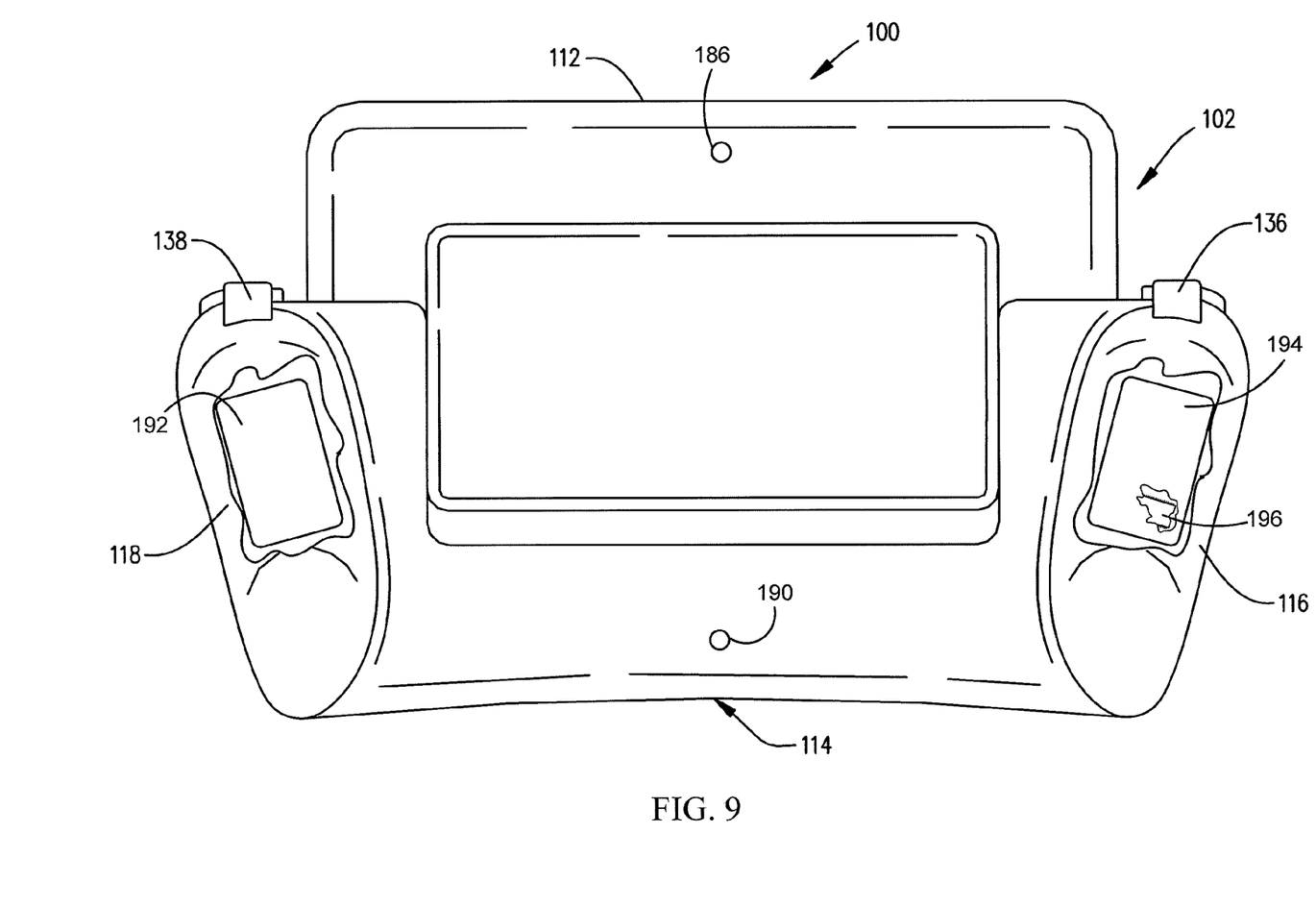
FIG. 9 depicts a back plan view of the combination of FIG. 8.

FIG. 8 shows in a preferred embodiment, the G & D 100 includes a first camera 184, on a first side of the tablet computer 102, a second camera 186, on the back side of the tablet computer 102 (shown by FIG. 9), a third camera 188 on a first side of the input device 114, and a fourth camera 190 on the back side of the input device 114 (shown by FIG. 9).

In a preferred embodiment, each of the four cameras may selectively function independently, or may be used in conjunction with one another, and each of the four cameras 184, 186, 188, and 190 are fully functional in capturing still and video images. Additionally, and preferably, the first and second cameras 184 and 186, are fully operative, even when the tablet computer 102 is detached from the input device 114, while the third and fourth cameras 188 and 190 are fully functional, even when the input device 114 is detached from the tablet computer 102.

In a preferred embodiment, when the tablet computer 102 is nested in the input device 114, the first and second cameras, 184 and 186, are responsive, either independently or simultaneously, to input from either the tablet computer 102, or the input device 114, depending on which device is selected for control of the first and second cameras, 184 and 186. Further, in the preferred embodiment, each the tablet computer 102 and the input device 114, are configured with a Bluetooth protocol stack communication feature, which permits the user to operate the first and second cameras, 184 and 186, of the tablet computer 102 with the input device 114, even when the tablet computer 102 is detached from the input device 114. Likewise, when the tablet computer 102 and the input device 114 are configured with a Bluetooth protocol stack communication feature, the user may operate the third and fourth cameras, 188 and 190, of the input device 114, using the tablet computer 102. In other words, in the preferred embodiment, each of the four cameras 184, 186, 188, and 190, may be selectively operated, individually or collectively, whether or not the tablet computer 102 is nested within the input device 114.

FIG. 9 shows that in a preferred embodiment, the input device 114, includes an auxiliary power source 192, and an auxiliary data storage device 194, which preferably includes a cache portion 196. Preferably, the auxiliary power source 192, is a lithium ion battery, which provides power to the input device 114, and the tablet computer 102, when the power source of the tablet computer 102 is depilated; and the data storage device 194 is a solid state hard drive.

In the preferred embodiment, the cache 196 is sized to buffer synchronized input from each of the cameras 184, 186, 188, and 190, such that the auxiliary data storage device 194 may store and retrieve images, still or video, for display seamlessly, including a simultaneous output of video images recorded by each of the cameras 184, 186, 188, and 190.

In a non-limiting exemplary application of utilizing the cameras 184, 186, 188, and 190, the first camera 184 could be trained on an information presenter, while the second camera 186 is trained on a portion of an audience attending the presentation. The third camera 188, could be trained on a screen used by the presenter for presenting their information to the audience, while the fourth camera is trained on an alternate portion of the audience. By simultaneously replaying the recorded presentation, a response of the audience to the information, and sequence of information being presented, may be analyzed for fostering improvements to the presentation.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular tablet computer without departing from the spirit and scope of the present invention.

What is claimed is:

1. A device comprising:
    a computing device, the computing device providing a plurality of sides, each of the plurality of sides are disposed between an electronic display screen of the computing device and a back of the computing device;
    an input device in electronic communication with the computing device, the input device providing side structures and a bridge portion disposed between the side structures, the side structures adjacent to and confining the computing device on at least two opposing sides but not more than three sides of the plurality of sides of the computing device, the input device further providing input module apertures, each input module aperture accepts either a game control module or a removable keyboard module as selected by a user, wherein said input module apertures are adjacent each of the at least two opposing sides of the plurality of sides of the computing device, and wherein the bridge portion conceals not more than one third of the back of the computing device; and
    a camera communicating with each the input device and the computing device, the camera captures either still or video images as selected by the user.

2. The device of claim 1, in which the keyboard module provides an auxiliary electronic display screen having at least the functionality of the electronic display screen.

3. The device of claim 1, further comprising an auxiliary power source communicating, with each the input device and the computing device.

4. The device of claim 1, further comprising an auxiliary data storage device communicating with each the input device and the computing device.

5. The device of claim 1, in which the camera is a first camera, and further comprising a second camera, the first camera having a lens facing the user while the user is facing the electronic display screen, and the second camera having a lens facing in a direction opposite that of the first camera.

6. The device of claim 1, in which the removable keyboard module is a pair of touch responsive electronic display screens, each of the touch responsive electronic display screens having at least the functionality of the electronic display screen, includes the functionality of a mouse pad, and presents virtual keys of a keyboard for information entry.

7. The device of claim 2, further comprising an auxiliary power source communicating with each the input device and the computing device.

8. The device of claim 7, further comprising an auxiliary data storage device communicating with each the input device and the computing device.

9. The device of claim 8, in which the camera is a first camera, and further comprising a second camera, the first camera having a lens facing the user while the user is facing the electronic display screen, and the second camera having a lens facing in a direction opposite that of the first camera.

10. The device of claim 9, in which the auxiliary electronic display screen includes the functionality of a mouse pad, the mouse pad functionality of the auxiliary electronic display screen controlling a pointer device of the electronic display screen.

11. An apparatus comprising:
    a computing device, the computing device providing a plurality of sides, each of the plurality of sides are disposed between an electronic display screen of the computing device and a back of the computing device;
    an input device in electronic communication with the computing device, the input device providing side structures and a bridge portion disposed between the side structures, the side structures adjacent to and confining the computing device on at least two opposing sides but not more than three sides of the plurality of sides of the computing device, and the bridge portion conceals not more than one third of the back of the computing device;
    an application displayed on the electronic display screen of the computing device; and
    means for a user's interaction with the application displayed on the electronic display screen of the computing device.

12. The apparatus of claim 11, in which the means for a user's interaction with the application displayed on the electronic display screen of the computing device comprises:
    input module apertures provided by the input device, each input module aperture accepts either a game control module or a keyboard module as selected by a user, wherein said input module apertures are adjacent each of the at least two opposing sides of the plurality of sides of the computing device; and
    a camera communicating with each the input device and the computing device, the camera capturing either still or video images as selected by the user, and in which the camera is responsive to at least the removable keyboard module when said keyboard module is operatively installed by the user within the input module aperture.

13. The apparatus of claim 12, in which the removable keyboard module is a pair of touch responsive electronic display screens, each of the touch responsive electronic display screens having at least the functionality of the electronic display screen, includes the functionality of a mouse pad, and presents virtual keys of a keyboard for information entry.

14. The apparatus of claim 13, further comprising an auxiliary power source communicating with each the input device and the computing device.

15. The apparatus of claim 14, further comprising an auxiliary data storage device communicating with each the input device and the computing device.

16. The apparatus of claim 15, in which the camera is a first camera, and further comprising a second camera, the first camera having a lens facing the user while the user is facing the pair of touch responsive electronic display screens, and the second camera having a lens facing in a direction opposite that of the first camera.

17. The apparatus of claim 16, in which said first and second cameras are operational when the computing device is either attached or detached from the input device.

18. The apparatus of claim 12, further comprising an auxiliary power source communicating with each the input device and the computing device, the auxiliary power source is fully functional when the computing device is either attached or detached from the input device.

19. The apparatus of claim 12, further comprising an auxiliary data storage device communicating with each the input device and the computing device, the data storage device is fully functional when the computing device is either attached or detached from the input device.

20. The apparatus of claim 16, in which said first and second cameras are fully functional when the computing device is either attached or detached from the input device, and further comprising:

an auxiliary power source communicating with each the input device and the computing device, the auxiliary power source is fully functional when the computing device is either attached or detached from the input device; and an auxiliary data storage device communicating with each the input device and the computing device, the data storage device is operational when the computing device is either attached or detached from the input device.

\* \* \* \* \*